July 17, 1962  J. H. LENZ  3,044,447
ANIMAL WATERING DEVICE
Filed Sept. 23, 1959  2 Sheets-Sheet 1

INVENTOR.
JOHN H. LENZ
BY
ATTORNEY

July 17, 1962 J. H. LENZ 3,044,447
ANIMAL WATERING DEVICE
Filed Sept. 23, 1959 2 Sheets-Sheet 2

INVENTOR.
JOHN H. LENZ
BY
Richard J. Lenk
ATTORNEY

United States Patent Office 3,044,447
Patented July 17, 1962

3,044,447
ANIMAL WATERING DEVICE
John H. Lenz, Winneshiek, Iowa
(R.R. 1, Mabel, Minn.)
Filed Sept. 23, 1959, Ser. No. 841,876
2 Claims. (Cl. 119—75)

This invention relates to a farm animal watering device which is operable under freezing conditions. More particularly it relates to a self-draining watering device which does not require special heating elements for thawing purposes.

One of the most bothersome conditions which confronts the raising of farm animals during the wintertime is the freezing of the water supply. This is particularly true where animals are kept outside or under lean-to shelters. In the past, many types of devices have been used to keep the water from freezing. Some of these include electrical heating elements as well as recirculating systems which, by their very nature, are somewhat complicated and expensive.

The present invention has as a primary object, the provision of an animal watering device which is self draining thereby leaving no water in the lines which will freeze, the device being operable by the animal at the specific time it is drinking.

Another object of the invention is to provide a watering device which does not require external heat or circulating systems to keep the water from freezing.

A further object of the invention is to provide a watering device which is easily operable by the animal and which will not become inoperative when ice forms in the drinking cup or container.

A still further object of the invention is to provide a watering device which is easily installed with a minimum of cost.

Other objects and advantages of the invention will become more apparent during the course of the following description when taken in connection with the accompanying drawings.

In the drawings, where like numerals are employed to designate like parts throughout the same:

Figure 1:
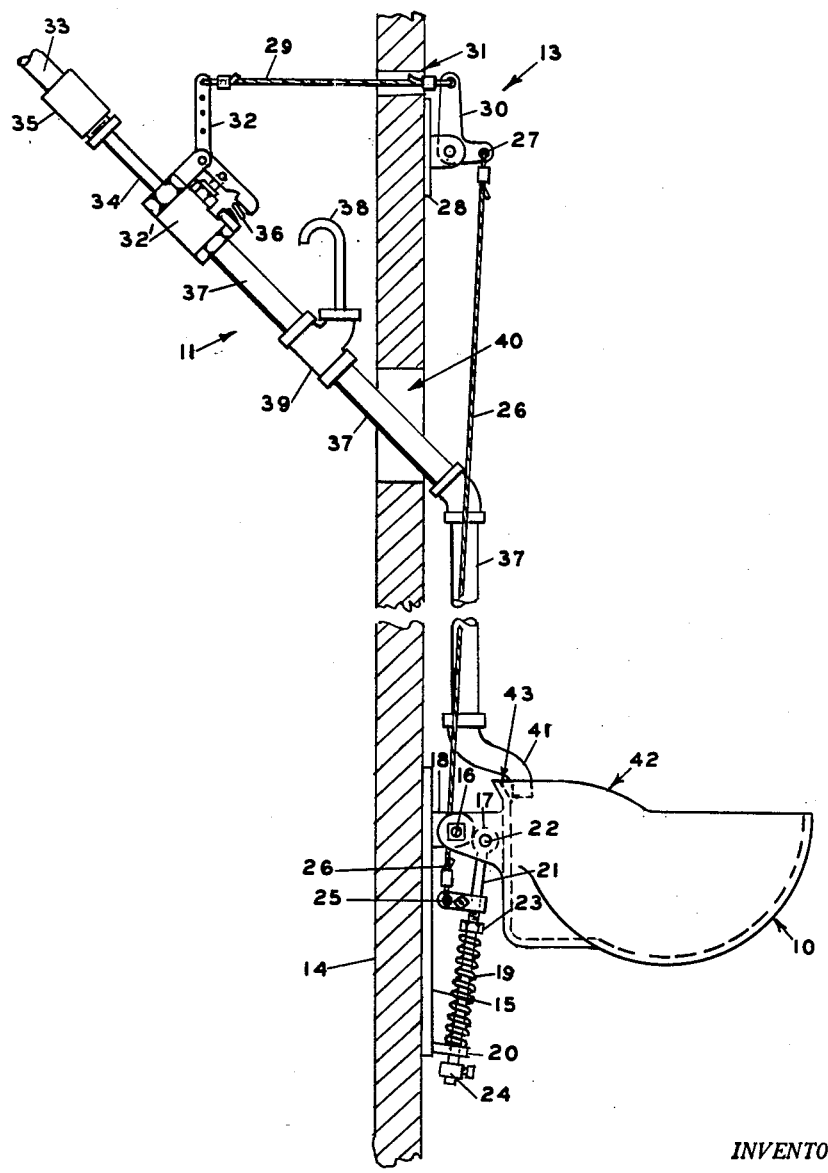
FIG. 1 is a fragmentary side elevational view of the watering device shown mounted on a conventional wall or partition.
Figure 2:
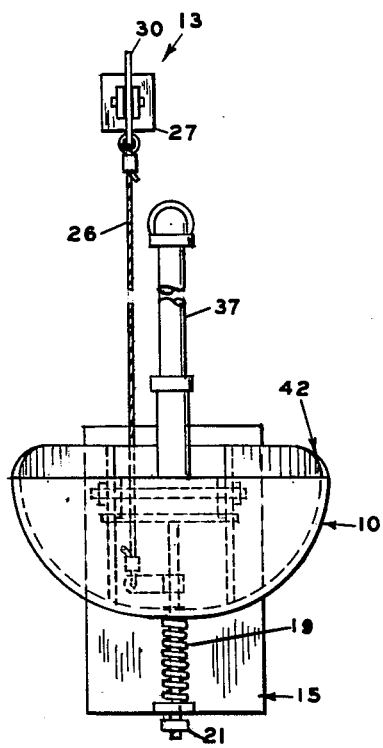
FIG. 2 is a fragmentary front elevational view of the watering device shown in FIG. 1.

Basically the invention includes a watering cup or bowl 10 and a filling system generally indicated at 11. In use, an animal wishing to drink, nuzzles into the watering cup and in so doing causes it to depress and pivot downwardly a slight amount. Downward movement of the cup activates the filling system 11 through a linkage generally indicated at 13 thereby causing water to run into the cup. When the animal is through drinking, the cup is caused to return to its normal position thereby shutting off the water.

The cup is pivotally mounted on a wall or partition 14 by a bracket 15. A pin passing through a pair of meshing ears 17 and 18 on the cup and bracket respectively mounts the cup for vertical pivotal movement.

Figure 3:
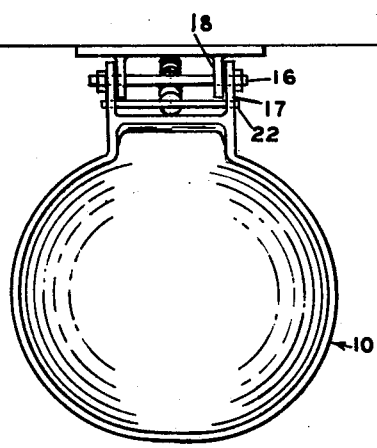
FIG. 3 is a top plan view of the cup of the watering device.

The cup is urged to a horizontal position by a compression spring 19 bearing against a tab 20 on the bottom of the mounting plate 15 and acting through a push rod 21. The push-rod has a T section 22 (FIG. 3) at its upper end pivotally connected between the ears 17 of the bowl. The lower end of the push-rod extends downwardly through the compression spring and is guided through a hole in the tab 20. A nut 23 threaded on the push-rod bears against the top of the spring 19 to provide the bearing surface against which the spring acts. The push-rod is prevented from slipping out of the tab 20 by a set screw collar 24 on the lower end thereof.

A finger 25 is fixed on the push-rod above the nut 23 and has connected thereto a cable 26. The cable is connected to the short arm 27 of a bell crank lever secured by a suitable bracket 28 to the wall 14. A second cable 29 is fastened to a longer leg 30 of the bell crank and passes thru an opening 31 in the wall to a lever 32 on a normally closed valve 32' of the filling system 11.

The filling system 11 is connected to a conventional water pipe 33, which may, as shown in the present instance, be located within a barn or building protected from freezing conditions. By way of example, the water pipe 33 may be taken to be a standard ¾" line. Then, according to the present invention, a reduced pipe section 34 of, for example, ½" diameter is connected by suitable bushing 35 to the main line 33. Connected to the end of the reduced section 34 is the valve 32' which is normally biased closed by a spring or similar means 36.

From the outlet side of the valve 32' there extends an enlarged pipe section 37 of a larger diameter than the main supply line 33. In this instance for example, pipe section 37 is a 1" diameter pipe. The larger pipe section 37 is vented to the atmosphere by a suitable means such as smaller pipe 38 of, for example, ¼" diameter, connected thereto by a T fitting 39. The larger pipe section 37 passes through an opening 40 in the wall 14 and thence downwardly into a suitable nozzle 41 which is positioned to direct water into the cup 10. According to the invention the piping extending from the outlet side of the valve 32' is pitched preferably with respect to the horizontal, at least 3" per foot.

By way of explanation, the volume of water passing from the main supply line 33 through the smaller reduced pipe section 34 is reduced because of the smaller cross sectional area of the latter pipe. As the water passes through the valve 32' it enters the larger diameter pipe 37 which is able to carry a greater amount of water than it is possible to pass through the reduced pipe section 34. Thus, because of the reduced volume which enters the larger pipe section 37, such section is never filled completely with water, and the water therein tends to drain downwardly into the watering cup 10. To further prevent the water from being held in the larger pipe section 37, the vent 38 releases all vacuum tendencies by venting the pipe to the atmosphere. Therefore, all water which enters the larger pipe section 37 will automatically drain downwardly into the cup and will not be held within such section. Consequently, the pipe section 37 is always dry and will not be subject to ice blockage when exposed to freezing conditions.

It should be pointed out that the end of the nozzle 41 should be located generally slightly above the top water level of the cup or container so that water will not be trapped within the pipe and freeze in cold weather. In the present instance, a flange 42 extends around the rear portion of the bowl to prevent splashing as the water enters the cup. However, this may be modified without departing from the inventive concept. The flange flares backwardly as at 43 to allow the cup to tilt without striking the nozzle.

In operation, as an animal depresses the cup 10, the push-rod 21 and finger 25 connected thereto are moved downwardly. Movement of the finger 25 pulls the cable 26 and actuates the bell crank lever 27 which in turn opens the valve 32' through the lever 30 and cable 29. Opening of the valve allows water to pass through the reduced pipe section 34 into the large pipe section 37 and thence to the cup. When the animal has completed drinking and lifts away from contact with the cup, spring 19 returns the cup to its normal position. This allows valve 32' to close when the push-rod 21 moves upwardly and transmits the motion through the cables 26 and 29, and the bell crank arms 27 and 30.

As the valve is closed, water coming from the main supply line 33 is cut off and any water in the larger pipe section 37 instantly drains downwardly into the cup leaving such pipe empty. Thus, no water remains in the pipe section 37 to freeze and prevent water from flowing when the cup is again actuated. While a small amount of ice may form in the cup, it does not accumulate to any extent since cattle in drinking generally melt the ice thus preventing a substantial build up.

Figure 4:
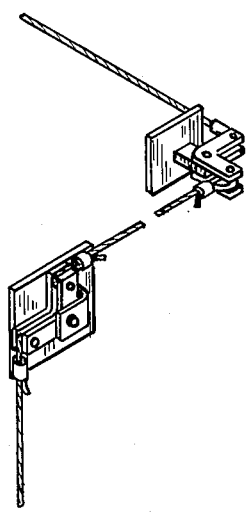
FIG. 4 is a view showing an alternate method of activating the valve action of the watering device and will be described in the specification.

An alternate method of transferring movement of the cup 10 to actuate the valve 32' is shown in FIGURE 4. In this embodiment a pair of bell crank levers are arranged for use when it is necessary to locate the connecting cables parallel to a wall before passing through an appropriate opening therein.

It was found that both cattle and hogs used the present invention throughout a very servere winter. Because the actuation of the water supply does not depend on a tongue mounted within the cup which can be easily entrapped in ice, the device does not have a tendency to become inoperative as many other watering devices do. Further, because of its simplicity requiring neither electrical heating coils nor circulating connections, it is very easily and economically installed.

While the watering cup of the invention has been shown as being mounted on the side of a barn wall with the source of water being in the barn, it is, of course, obvious that it may be connected to a water supply in other suitable enclosures, or it may be mounted completely outside with the main source of water being protected or heated in some manner such as to enable it to be available at the filling system 11 at all times.

Also while a mechanical linkage has been shown between the cup or container 10 and the valve 32', it is possible to utilize an electrically operated solenoid valve or the like actuated by an appropriate switch at the cup. In such case, it would not be necessary to have the cup pivotally mounted. Obviously, the cup may take the shape of different containers which may also be made to accommodate a number of animals at one time.

It is also to be understood further that the forms of the invention disclosed herein are to be taken as the preferred embodiments thereof and various changes in the shape, size or arrangements of the parts may be resorted to without disturbing the spirit of the invention or the scope of the following claims.

I claim:
1. An animal watering device operable under freezing conditions, comprising a water container, a filling system for directing water to said container connected to a main pipe which is protected from freezing, said filling system including a self-draining second pipe of larger dimension than said main pipe, said second pipe extending downwardly to bring water to said container and terminating above the maximum water containing level of said container, a valve connected to said main pipe for controlling the flow of water to said second pipe, and means operable by an animal when in drinking position at said container connected to said valve to open the latter and cause water to flow into said container.

2. An animal watering device as claimed in claim 1, wherein said second pipe is vented to the atmosphere to allow it to drain completely when said valve is closed.

References Cited in the file of this patent
UNITED STATES PATENTS

| | | |
|---|---|---|
| 1,773,039 | Guymon | Aug. 12, 1930 |
| 1,841,866 | Wilson | Jan. 19, 1932 |
| 2,632,463 | Martin | Mar. 24, 1953 |